US010926951B1

(12) United States Patent
Yi

(10) Patent No.: US 10,926,951 B1
(45) Date of Patent: Feb. 23, 2021

(54) MATERIAL RACK

(71) Applicant: TRIPLE WIN TECHNOLOGY(SHENZHEN) CO. LTD., Shenzhen (CN)

(72) Inventor: Wen-Jie Yi, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/599,240

(22) Filed: Oct. 11, 2019

(30) Foreign Application Priority Data

Jul. 31, 2019 (CN) .......................... 201910703513.1

(51) Int. Cl.
*B65G 1/10* (2006.01)
*B65G 1/02* (2006.01)
*B65D 25/00* (2006.01)
*A47B 57/08* (2006.01)

(52) U.S. Cl.
CPC .............. *B65G 1/10* (2013.01); *B65D 25/005* (2013.01); *B65G 1/026* (2013.01); *A47B 57/08* (2013.01)

(58) Field of Classification Search
CPC ........ B65G 1/10; B65G 1/026; B65D 25/005; B65D 7/40; A47B 57/08; A47B 51/00; A47B 57/265
See application file for complete search history.

(56) References Cited

U.S. PATENT DOCUMENTS

| | | | | |
|---|---|---|---|---|
| 1,829,770 A * | 11/1931 | Tannewitz | ............ | E05B 65/462 312/221 |
| 3,404,929 A * | 10/1968 | Wright | .................. | E05B 65/463 312/216 |
| 4,355,851 A * | 10/1982 | Slusser | ................ | E05B 65/463 312/215 |
| 4,401,350 A * | 8/1983 | Fortune | ................. | A47B 87/02 292/128 |
| 4,865,404 A * | 9/1989 | Harper | ................. | E05B 65/463 312/221 |
| 5,599,078 A * | 2/1997 | Dechene | ............... | E05B 65/464 312/217 |
| 5,829,859 A * | 11/1998 | Cram | .................... | E05B 65/464 312/221 |
| 6,409,290 B1 * | 6/2002 | Lin | ........................ | E05B 65/462 312/217 |
| 6,615,993 B1 * | 9/2003 | Rudiger | ............... | H05K 7/1489 211/175 |
| 8,696,074 B2 * | 4/2014 | Romaen | ............... | E05B 65/464 312/215 |
| 9,382,730 B1 * | 7/2016 | Chen | ..................... | E05B 65/462 |
| 10,151,896 B2 * | 12/2018 | Solheid | ............... | G02B 6/3893 |

(Continued)

FOREIGN PATENT DOCUMENTS

TW M376866 U1 3/2010

*Primary Examiner* — Ko H Chan
(74) *Attorney, Agent, or Firm* — ScienBiziP, P.C.

(57) ABSTRACT

A material rack includes a frame, at least one tray and at least one stopper. Each tray is movably received in the frame in a first direction. Each stopper is movably received in the frame in a second direction, and comprises at least one stopping portion. An edge of each tray is recessed toward the stopper to form at least one stopping groove. Each stopping portion is detachably received in one of the at least one stopping groove. The first direction is different from the second direction.

15 Claims, 4 Drawing Sheets

(56) References Cited

U.S. PATENT DOCUMENTS

| | | | |
|---|---|---|---|
| 10,178,911 B2 * | 1/2019 | Hewitt | A47B 96/061 |
| 10,633,183 B2 * | 4/2020 | Johncox | B65D 19/06 |
| 10,676,964 B2 * | 6/2020 | Milligan | E05B 65/462 |

* cited by examiner

MATERIAL RACK

FIELD

The subject matter herein generally relates to a material rack.

BACKGROUND

In the manufacturing industry, a material rack is used to transport various types of material to loading and unloading on an automated machine. However, the material may easily slip off during transportation.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
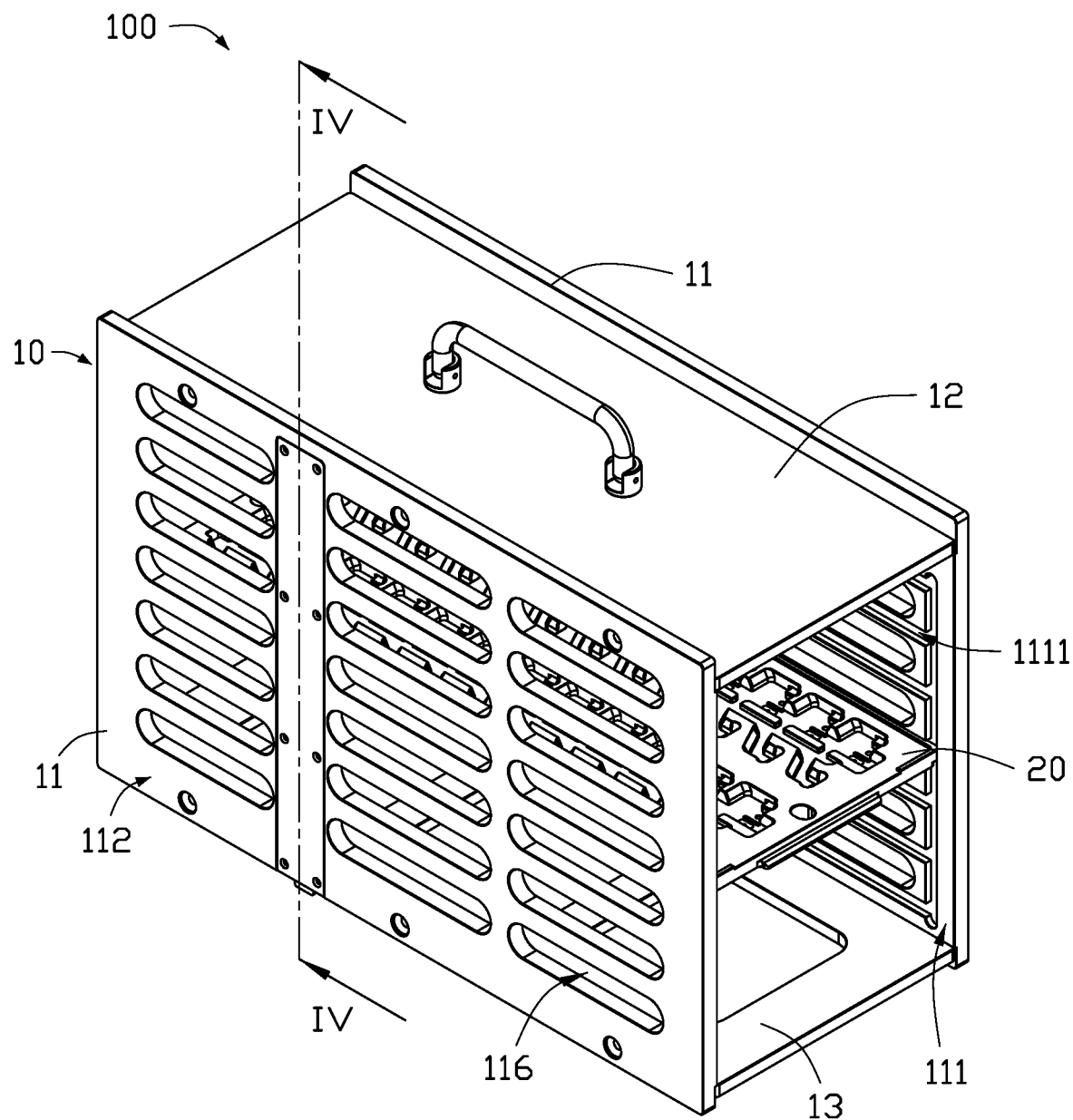
FIG. 1 is a diagram of an embodiment of a material rack.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, Group, series, and the like.

Figure 2:
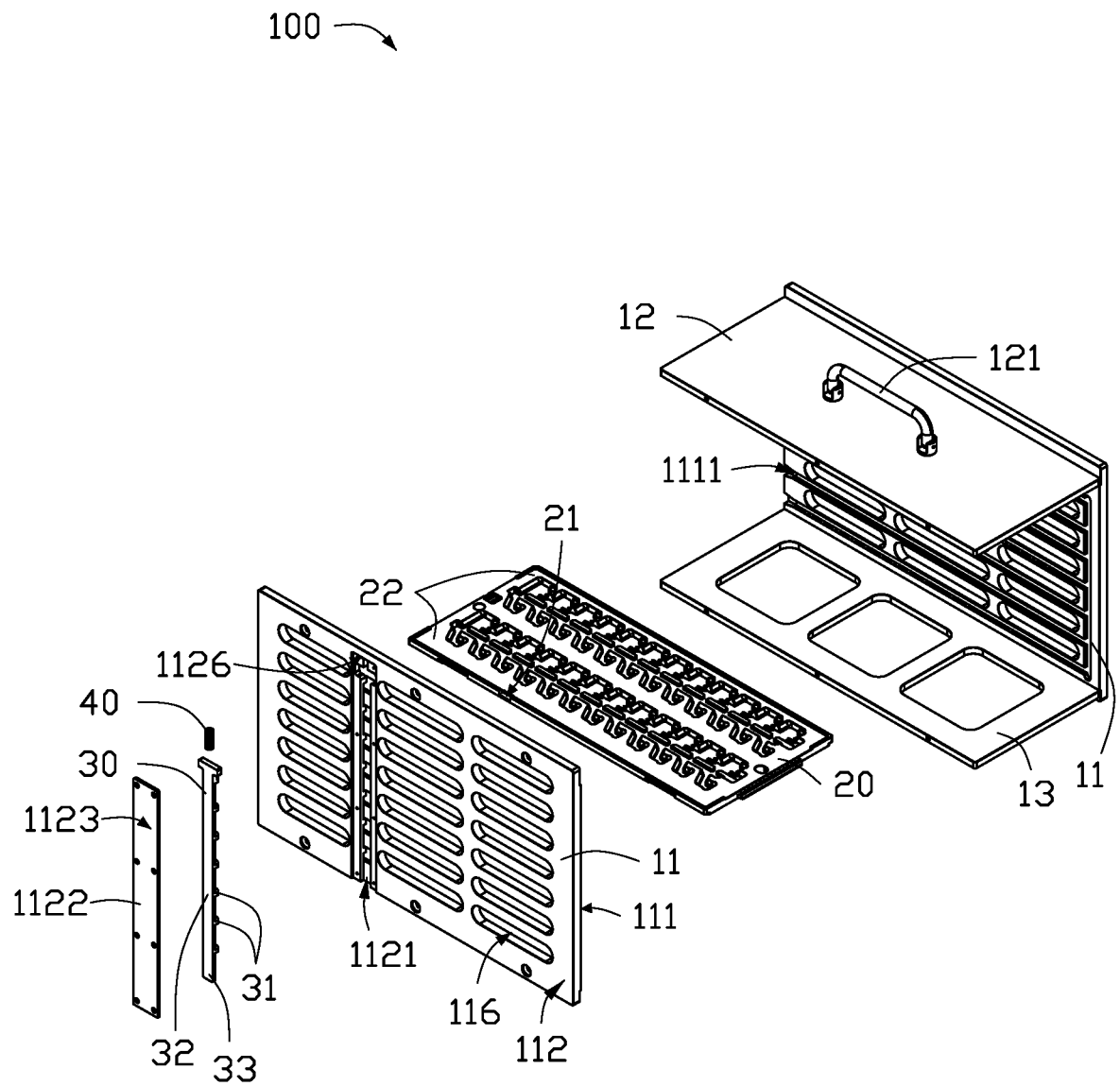
FIG. 2 is an exploded, diagrammatic view of an embodiment of the material rack of FIG. 1.

FIG. 1 illustrates an embodiment of a material rack 100 for transporting various materials, such as circuit boards, electronic components, etc. Referring to FIG. 2, the material rack 100 includes a frame 10, at least one tray 20, and at least one stopper 30. The tray 20 is used for holding materials. Each tray 20 is movably received in the frame 10 in a first direction. Each stopper 30 is movably received in the frame 10 in a second direction. Each stopper 30 includes at least one stopping portion 31. An edge of each tray 20 is recessed toward the stopper 30 to form at least one stopping groove 21. Each stopping portion 31 is detachably received in one stopping groove 21. The first direction is different from the second direction.

The tray 20 has two states as the stopping portion 31 reciprocates in the second direction, that is, a locking state and a free state. When in the locking state, the stopping portion 31 is received in the stopping groove 21, a movement of the tray 20 in the first direction is restricted. When in the free state, the stopping portion 31 is separated from the stopping groove 21, the movement of the tray 20 in the first direction is not limited.

In at least one embodiment, the frame 10 may be substantially a hollow cuboid. The frame 10 includes two side walls 11 which are parallel and opposite to each other. Each side wall 11 includes an inner surface 111 and an outer surface 112 facing away from the inner surface 111. The inner surfaces 111 of the two side walls 11 face each other. The inner surface 111 is provided with a plurality of sliding channels 1111. The sliding channels 1111 are equally spaced and parallel. Each tray 20 includes two opposite end portions 22. The opposite end portions 22 are received in two corresponding sliding channels 1111 of the two side walls 11, and slide along the sliding channels 1111 in the first direction.

In at least one embodiment, the second direction may be perpendicular to the first direction.

Figure 3:
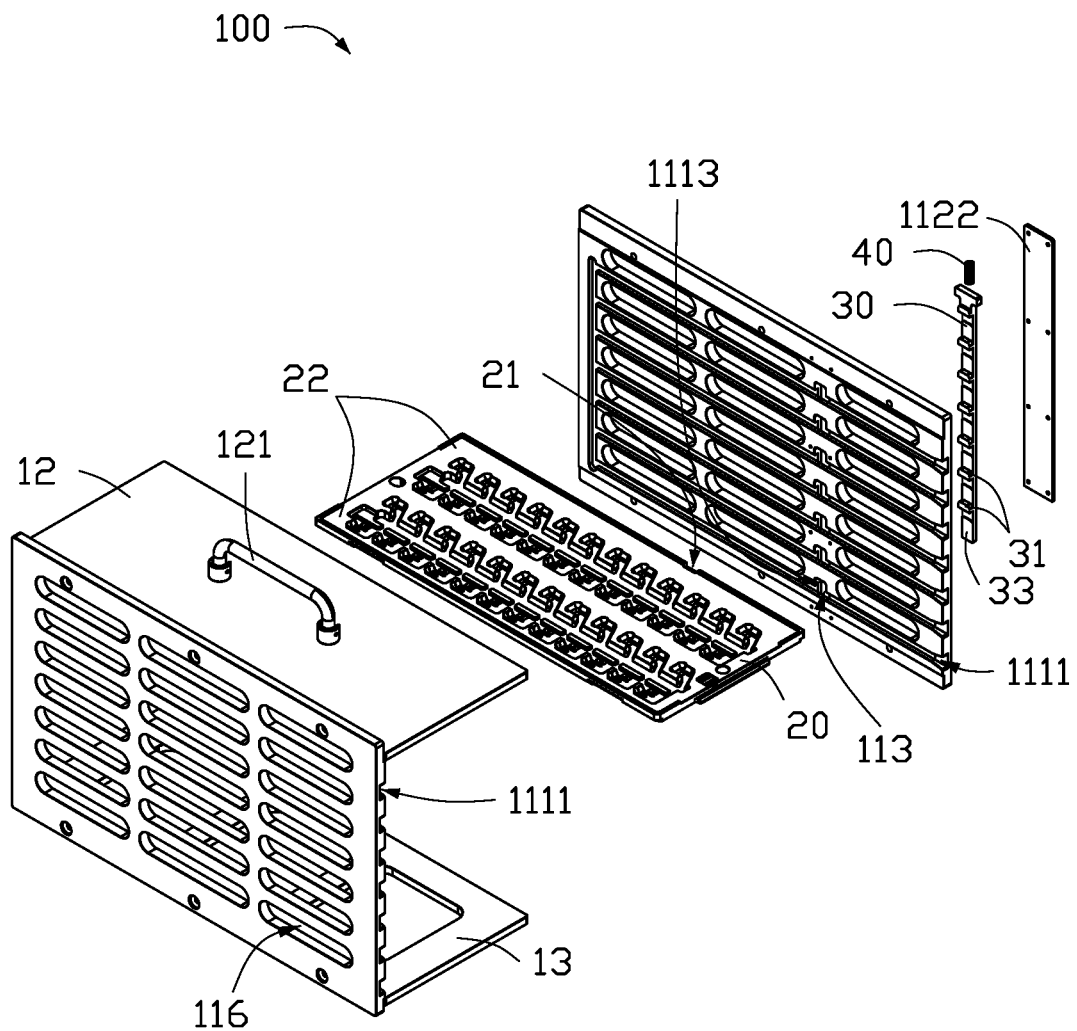
FIG. 3 is exploded, diagrammatic view of an embodiment of the material rack of FIG. 1 viewed from another angle.

In at least one embodiment, referring to FIG. 3, at least one opening 1113 is defined on the side wall 11 along the second direction and adjacent to one of the sliding channels 1111. Each opening 1113 communicates with the adjacent sliding channel 1111. Each stopping portion 31 slides in the opening 1113 and the adjacent sliding channel 1111 in the second direction. When the tray 20 is in the locking state, the stopping groove 21 correspond to the opening 1113 and communicates with the opening 1113, the stopping portion 31 is received in the stopping groove 21 to lock the tray 20. When the stopping portion 31 slides out of the stopping groove 21, the tray 20 can slide along the sliding channel 1111 in the first direction. That is, the tray 20 is in the free state.

In at least one embodiment, each opening 1113 passes through one of the side walls 11.

In at least one embodiment, the outer surface 112 may be recessed toward each sliding channel 1111 to form a through hole 113. Each through hole 113 communicates with the corresponding sliding channel 1111 and the adjacent opening 1113. When the tray 20 is in the locking state, the stopping portion 31 passes through the through hole 113 to cooperate with the stopping groove 21 to lock the tray 20.

Figure 4:
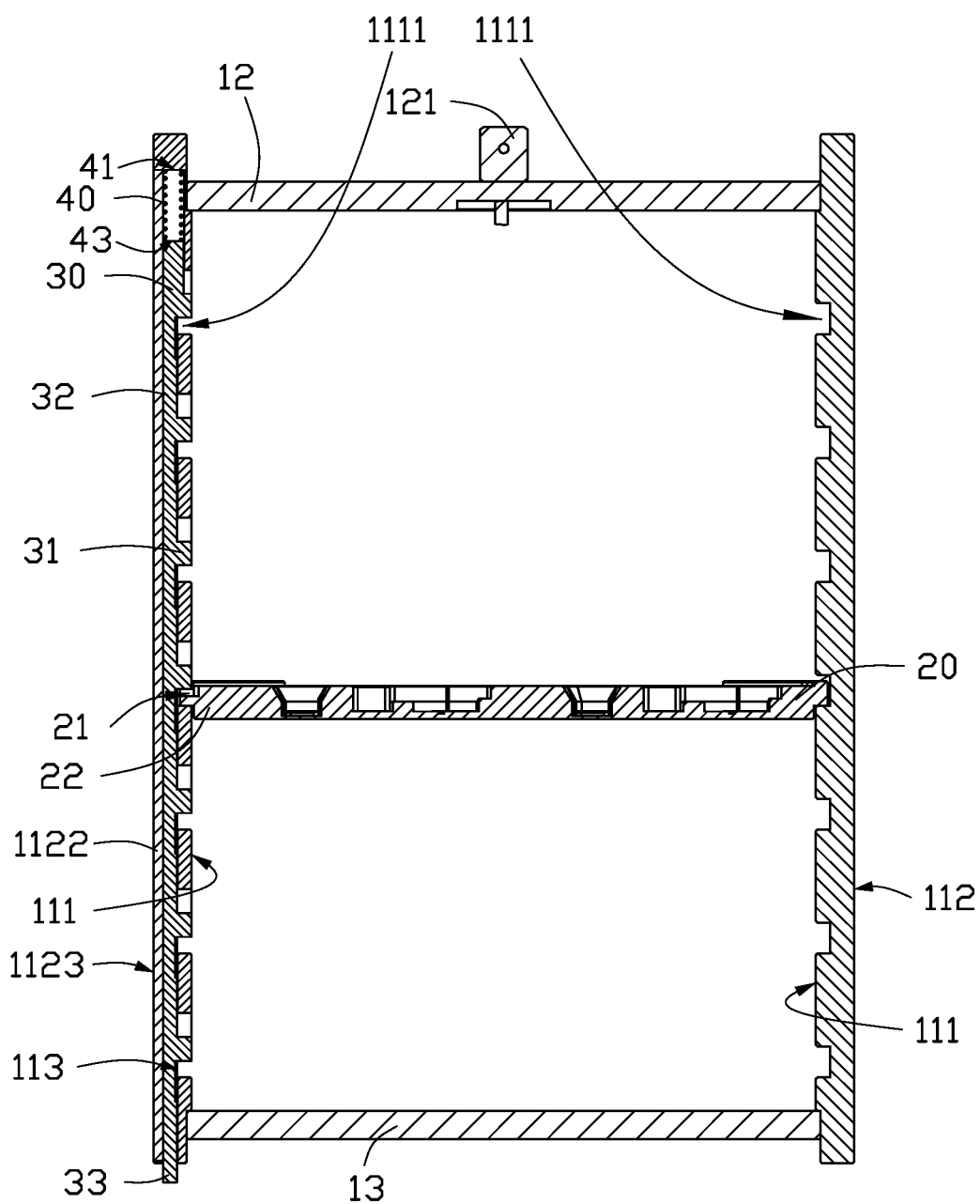
FIG. 4 is a cross-sectional view of an embodiment of the material rack taken along IV-IV line of FIG. 1.

In at least one embodiment, referring to FIGS. 2 and 4, the stopper 30 further includes a main body 32. The at least one stopping portion 31 protrudes from a side of the main body 32. When the number of the at least one stopping portion 31 is more than or equal to two, the stopping portions 31 are spaced. The side of the main body 32 abuts against the outer surface 112.

In at least one embodiment, a surface of each stopping portion 31 facing away from the main body 32 may be flush with the inner surface 111.

In at least one embodiment, the stopper 30 further includes a pushing portion 33 extending from the main body 32 in the second direction and exposing from the side wall 11.

When the pushing portion 33 moves in the second direction, the stopping portion 31 slides in the sliding channel 1111 and the opening 1113 in the second direction, thereby switching the tray 20 between the locking state and the free state. For example, when the pushing portion 33 is pushed to move upward, the pushing portion 33 drives the stopping portion 31 to the opening 1113 from the sliding channel 1111. So that the stopping portion 31 is out of the stopping groove 21, the tray 20 is in the free state. When the stopper 30 moves downward by its own gravity, the pushing portion 33 drives the stopping portion 31 to sliding channel 1111 from the opening 1113. So that the stopping portion 31 is received in the stopping groove 21, the tray 20 is in the locking state.

In at least one embodiment, referring to FIGS. 1 and 2, the outer surface 112 may recessed to form a receiving groove 1121 to receive the main body 32. A shape of the receiving groove 1121 is similar to a shape of the main body 32. The opening 1113 and the through hole 113 communicate with the receiving groove 1121. A cover plate 1122 is mounted on the outer surface 112 to cover the main body 32. A depth of the receiving groove 1121 is greater than a thickness of the main body 32 and is less than a thickness of the stopper 30. In at least one embodiment, the cover plate 1122 is also received in the receiving groove 1121, the depth of the receiving groove 1121 is greater than a total thickness of the main body 32 and the cover plate 1122 and is less than a total thickness of the stopper 30 and the cover plate 1122. A surface of the cover plate 1122 facing away from the main body 32 is flush with the outer surface 112.

In at least one embodiment, the material rack 100 may further include an elastic member 40. The elastic member 40 is received in the receiving groove 1121, and includes a first end 41 and a second end 43 facing away from the first end 41. An internal surface 1126 surrounds to form the receiving groove 1121. The elastic member 40 is sandwiched between the internal surface 1126 and an end portion of the main body 32 facing away from the pushing portion 33. The first end 41 is fixed on the internal surface 1126, the second end 43 contacts the end portion of the main body 32. When the main body 32 slides to the elastic member 40, the elastic member 40 is compressed. For example, when the pushing portion 33 is pushed to move upward, the elastic member 40 is compressed. When the stopper 30 moves downward by its own gravity, the elastic member 40 is restored.

In at least one embodiment, the frame 10 may further include a cover sheet 12 and a baseboard 13 parallel to cover sheet 12. The cover sheet 12 and the baseboard 13 are perpendicular to and connect the two side walls 11, respectively. The cover sheet 12 and the baseboard 13 are adjacent to two opposite end portions of the side walls 11, respectively. The plurality of sliding channels 1111 is located between the cover sheet 12 and the baseboard 13.

A hand holder 121 may be mounted on the cover sheet 12 facing away from the baseboard 13 to facilitate the carrying of the material rack 100 by a person or a machine.

In at least one embodiment, a plurality of sight holes 116 is formed. Each of the plurality of sight holes 116 penetrates the inner surface 111 and the outer surface 112 of the side wall 11 to check the state of the tray 20 and the material contained in the tray 20, reducing a weight of the material rack 100, and improving a flexural strength of the material rack 100.

The material rack 100 can easily and conveniently realize a switching between the locking state and the free state of the tray 20 by a cooperation of the frame 10, and tray 20 and the stopper 30, thereby preventing material from slipping down, reducing a manual operation, reducing a cost, and improving efficiency.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A material rack comprising:
a frame;
a plurality of trays; and
at least one stopper;
wherein each of the plurality of trays is movably received in the frame in a first direction, each of the at least one stopper is movably received in the frame in a second direction, and each of the at least one stopper comprises a main body movably received in the frame in a second direction and a plurality of stopping portions protruding from a side of the main body, an edge of each of the plurality of trays is recessed toward the at least one stopper to form at least one stopping groove, each of the plurality of stopping portions is detachably received in one of the at least one stopping groove to lock the plurality of trays, the first direction is different from the second direction.

2. The material rack of claim 1, wherein the frame comprises two side walls which are parallel and opposite to each other, each of the side walls comprises an inner surface and an outer surface facing away from the inner surface, the inner surfaces of the two side walls face each other, the inner surface comprises a plurality of sliding channels; each of the plurality of trays further comprises two opposite end portions received in corresponding two of the sliding channels of the two side walls, the end portions slide along the sliding channels in the first direction.

3. The material rack of claim 2, wherein a plurality of openings is formed on each of the side walls along the second direction, each of the plurality of openings is adjacent to one of the plurality of sliding channels, each of the plurality of stopping portions slides in one of the plurality of openings and the adjacent sliding channel in the second direction, when the plurality of stopping portions is received in all stopping grooves of the plurality of trays, the plurality of trays is locked, when the plurality of stopping portions slides out of the stopping grooves, the plurality of trays is slidable along the sliding channels in the first direction.

4. The material rack of claim 3, wherein each of the plurality of openings penetrates one of the side walls.

5. The material rack of claim 4, wherein the outer surface is recessed toward each of the plurality of sliding channels to form a through hole, the through hole communicates with the corresponding sliding channel and the adjacent opening.

6. The material rack of claim 5, wherein the side of the main body abuts against the outer surface.

7. The material rack of claim 6, wherein each of the at least one stopper further comprises a pushing portion extending from the main body in the second direction and exposing from the side walls, the pushing portion is movable in the second direction to drive the plurality of stopping portions in the second direction.

8. The material rack of claim 7, wherein the outer surface is recessed to form a receiving groove to receive the main body, the plurality of openings and the through hole communicate with the receiving groove.

9. The material rack of claim 8, wherein a depth of the receiving groove is greater than a thickness of the main body and is less than a thickness of each of the at least one stopper.

10. The material rack of claim 8, wherein the material rack further comprises a cover plate mounted on the outer surface, the cover plate being configured to cover the main body.

11. The material rack of claim 10, wherein the cover plate is received in the receiving groove, a depth of the receiving groove is greater than a total thickness of the main body and the cover plate, and is less than a total thickness of the stopper and the cover plate.

12. The material rack of claim 11, wherein a surface of the cover plate facing away from the main body is flush with the outer surface of the material rack.

13. The material rack of claim 8, wherein the material rack further comprises at least one elastic member received in the receiving groove, the material rack further comprises an internal surface, the internal surface surrounds to form the receiving groove, the elastic member is sandwiched between the internal surface and an end portion of the main body facing away from the pushing portion.

14. The material rack of claim 13, wherein the elastic member comprises a first end and a second end facing away from the first end, the first end is fixed on the internal surface, the second end contacts the end portion of the main body.

15. The material rack of claim 2, wherein a plurality of sight holes is formed, each of the plurality of sight holes penetrates the inner surface and the outer surface of each of the side walls.

\* \* \* \* \*